(12) United States Patent
Ho

(10) Patent No.: US 8,742,917 B2
(45) Date of Patent: Jun. 3, 2014

(54) WARNING TRIANGLE STRUCTURE

(76) Inventor: Chang-Hsien Ho, Taoyuan County (TW)

( * ) Notice: Subject to any disclaimer, the term of this patent is extended or adjusted under 35 U.S.C. 154(b) by 632 days.

(21) Appl. No.: 13/012,009

(22) Filed: Jan. 24, 2011

(65) Prior Publication Data

US 2012/0188071 A1  Jul. 26, 2012

(51) Int. Cl.
| | |
|---|---|
| *B60Q 7/00* | (2006.01) |
| *G08B 5/22* | (2006.01) |
| *G08G 1/095* | (2006.01) |
| *B60Q 1/52* | (2006.01) |
| *F21S 8/10* | (2006.01) |
| *F21V 21/084* | (2006.01) |
| *B62J 6/00* | (2006.01) |
| *G09D 3/00* | (2006.01) |
| *G09F 7/00* | (2006.01) |
| *G06F 13/16* | (2006.01) |
| *E01F 9/00* | (2006.01) |

(52) U.S. Cl.
USPC ...... 340/473; 340/815.45; 340/908; 340/471; 362/545; 362/106; 362/474; 40/110; 40/612; 116/63 T; 116/63 P

(58) Field of Classification Search
CPC ....... E04C 3/40; E04C 2003/00; E04C 5/065; E04C 5/07; B60Q 7/00; B60Q 7/02; B60Q 9/002; B60Q 11/007; B60Q 2400/00; B60Q 2400/20; B60Q 2400/40; B60Q 1/302; H05K 5/0017; H05K 5/0091; H05K 11/02; G08B 5/006; E01F 9/0111; E01F 9/019; E01F 13/10

USPC .......... 340/473, 471, 908, 908.1, 693.1, 321, 340/815.45; 362/570, 106, 184, 223, 551, 362/565, 576, 562, 540; 385/146, 123, 147; 40/610, 612, 903, 591, 583, 617
See application file for complete search history.

(56) References Cited

U.S. PATENT DOCUMENTS

| | | | | |
|---|---|---|---|---|
| 5,551,370 | A | * | 9/1996 | Hwang ................... 116/63 T |
| 5,775,253 | A | * | 7/1998 | Quan et al. ............. 116/63 T |
| 2002/0059893 | A1 | * | 5/2002 | Kim ....................... 116/63 T |
| 2003/0196361 | A1 | * | 10/2003 | Wang ........................ 40/610 |
| 2006/0103543 | A1 | * | 5/2006 | Chen et al. ............ 340/815.45 |
| 2007/0011928 | A1 | * | 1/2007 | Wang ........................ 40/612 |
| 2007/0189028 | A1 | * | 8/2007 | Chen ........................ 362/545 |

FOREIGN PATENT DOCUMENTS

| | | | |
|---|---|---|---|
| EP | 2177400 A1 | * | 4/2010 |
| GB | 2311318 A | * | 9/1997 |

* cited by examiner

*Primary Examiner* — Jennifer Mehmood
*Assistant Examiner* — Mirza Alam
(74) *Attorney, Agent, or Firm* — Rosenberg, Klein & Lee

(57) ABSTRACT

A warning triangle has a simplified structure and is operable in accordance with the requirement of energy saving and manufactured at lower cost. The warning triangle structure includes a first board body, a second board body and a third board body, which are assembled with each other. Each of the board bodies has a first face and a second face, which together define an internal cavity. At least one light source and a light guide strip for guiding light are disposed in the cavity. The second and third board bodies are pivotally connected with movable stands for supporting the warning triangle in use. The second and third board bodies can be selectively collapsed onto the first and second faces of the first board body to minimize the volume of the warning triangle.

36 Claims, 11 Drawing Sheets

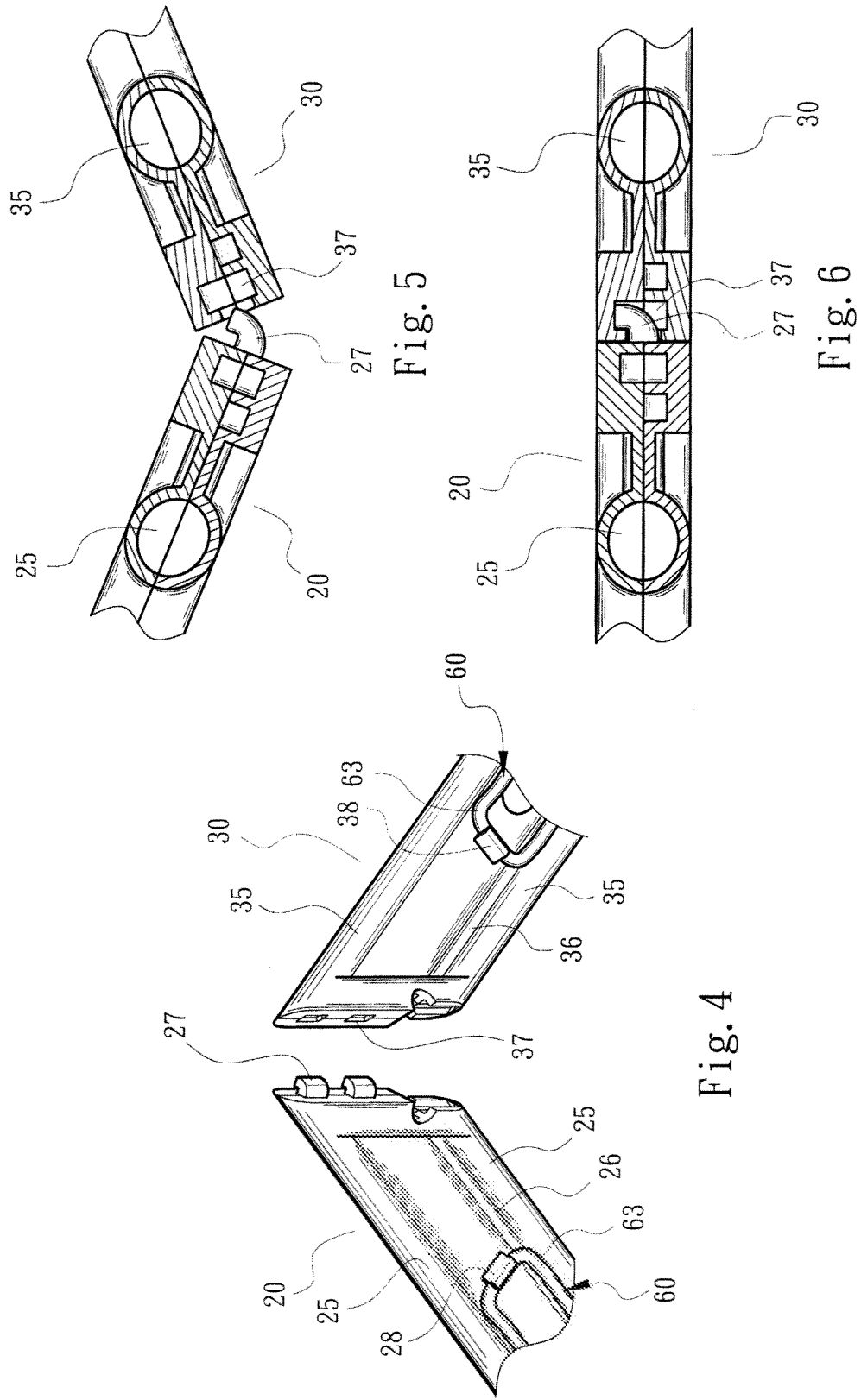

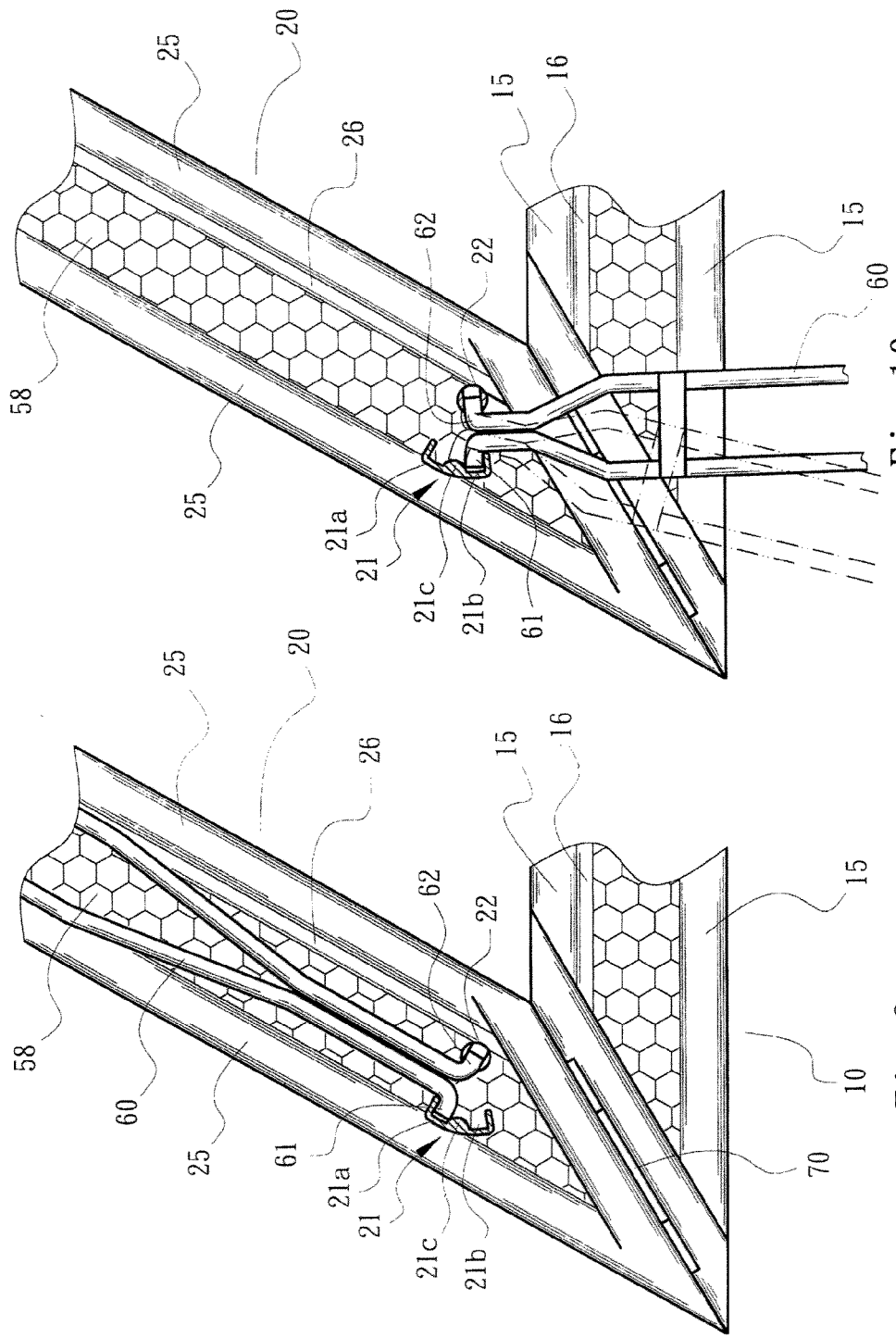

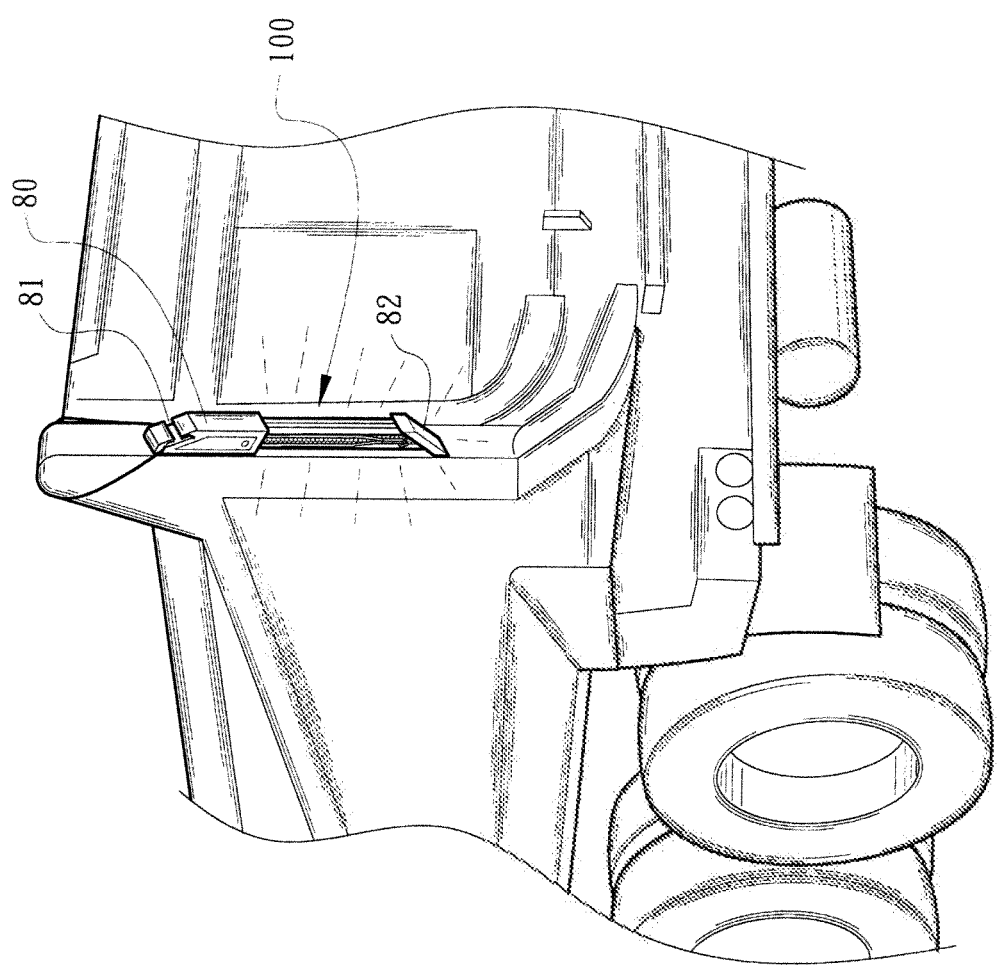

WARNING TRIANGLE STRUCTURE

BACKGROUND OF THE INVENTION

1. Field of the Invention

The present invention relates generally to a warning triangle structure, and more particularly to a warning triangle includes three board bodies assembled with each other. Each of the board bodies has a first face and a second face, which together define an internal cavity. Light sources and light guide strips for guiding light are disposed in the cavity. Stands are rotatably connected with the board bodies, whereby the warning triangle can be completely collapsed to minimize the volume of the warning triangle. In addition, the warning triangle is operable in accordance with the requirement of energy saving.

2. Description of the Related Art

A conventional warning triangle is composed of three board body units, which are assembled with each other to form a triangular body. Reflection boards are disposed on the surfaces of the board body units to achieve a warning effect for the rearward vehicle drivers. An improved warning triangle structure is provided with multiple light-emitting components (such as bulbs and LEDs), which are disposed in the board body units for emitting light. The light-emitting components are connected to cells or a power supply.

For example, Taiwanese Patent No. 94212379 discloses a vehicle-used warning triangle and Taiwanese Patent No. 96208773 discloses a breakdown warning triangle. It is well known by those who are skilled in this field that such warning triangle is provided with multiple continuously arranged light-emitting components mounted on the board body units for achieving clearer warning effect. The light-emitting components are connected to a power supply. In use of the conventional warning triangle, not only more power is consumed, but also the light is simply emitted from single side of the warning triangle. Moreover, the conventional warning triangle has relatively complicated structure and it is troublesome to assemble the conventional warning triangle. As a result, the manufacturing cost of the conventional warning triangle is higher.

In addition, it is a critical issue how to pivotally connect the board body units with each other. The board body units of the conventional warning triangles are provided with projection plates and insert ion holes or tenons and mortises or pin members and sockets or slide blocks and slide rails for connecting the board body units. For example, Taiwanese Patent No. 88204110 discloses a warning triangle structure, Taiwanese Patent No. 85220185 discloses a vehicle breakdown warning triangle structure, Taiwanese Patent No. 86208166 discloses a warning triangle structure, Taiwanese Patent No. 89201035 discloses a vehicle-used warning triangle engagement structure and Taiwanese Patent No. 96204935 discloses a warning triangle structure. Basically, these warning triangles are designed with connection structures for fixedly assembling the board body units with each other in emphasis on the use of the warning triangles. Therefore, when not used, some conventional warning triangles cannot be fully collapsed due to the pivot structures such as the projection plates, the tenons and the pin members between the board bodies. As a result, such warning triangle will occupy much room when stored. Some other conventional warning triangles are even designed with fixed structures that cannot be collapsed.

It is therefore tried by the applicant to provide an improved warning triangle structure in which the light-emitting components can emit light in accordance with the requirement of energy saving. Moreover, the warning triangle has simplified structure and is manufactured at lower cost. In addition, the warning triangle can be easily operated and fully collapsed to minimize the volume for easy storage.

SUMMARY OF THE INVENTION

It is therefore a primary object of the present invention to provide a warning triangle has a simplified structure and is operable in accordance with the requirement of energy saving and manufactured at lower cost. The warning triangle structure includes a first board body, a second board body and a third board body, which are assembled with each other. Each of the board bodies has a first face and a second face, which together define an internal cavity. At least one light source and a light guide strip for guiding light are disposed in the cavity. The second and third board bodies are pivotally connected with movable stands for supporting the warning triangle in use. The second and third board bodies can be selectively collapsed onto the first and second faces of the first board body to minimize the volume of the warning triangle.

To achieve the above and other objects, in the warning triangle structure of the present invention, the second and third board bodies are provided with socket seats and pin members for pivotally connecting with the stand. Each stand has two head ends and a tail end. The head ends of the stands are mounted in the socket seats and the pin members, whereby the stands are freely movable or rotatable. The stands can be unstretched and overlaid on the first and second faces of the second and third board bodies. Alternatively, the stands can be stretched about the socket seats and the pin members to support the board bodies for use of the warning triangle.

In the warning triangle structure of the present invention, a reflection unit is disposed between the first face and the second face of each board body for reflecting the light transmitted from the light source or the light guide strip out of the board body.

In the warning triangle structure of the present invention, a switch is disposed on the first board body. When the first, second and third board bodies are in the collapsed state, a user to press the switch to turn on the light sources for the light guide strips to emit warning light as a traffic baton or a warning baton.

In the warning triangle structure of the present invention, when the first, second and third board bodies are in the collapsed state, at least a part of the first, second and third board bodies is enclosed in a protective jacket. The protective jacket is formed with a slot for pivotally connecting with a fixing device or a sucker. Accordingly, as necessary, a user can conveniently affix the warning triangle to the surface of an article to achieve a warning effect.

The present invention can be best understood through the following description and accompanying drawings, wherein:

BRIEF DESCRIPTION OF THE DRAWINGS

FIG. 4 is a perspective view of a part of the second and third board bodies of the warning triangle of the present invention, showing the tenon section and mortise section of the second and third board bodies;

FIG. 5 is a sectional view showing that the second board body is to be assembled with the third board body;

FIG. 6 is a sectional view according to FIG. 5, showing that the second board body is assembled with the third board body;

FIG. 9 is a perspective view showing the structure of the socket seat, the pin member and the stand of the warning triangle of the present invention;

FIG. 10 is a perspective view according to FIG. 9, showing the operation of the socket seat, the pin member and the stand of the warning triangle of the present invention, also showing that the head end of the stand is moved within the socket seat;

FIG. 14 is a perspective view showing that the warning triangle of the present invention is hung on a truck.

DETAILED DESCRIPTION OF THE PREFERRED EMBODIMENTS

Figure 1:
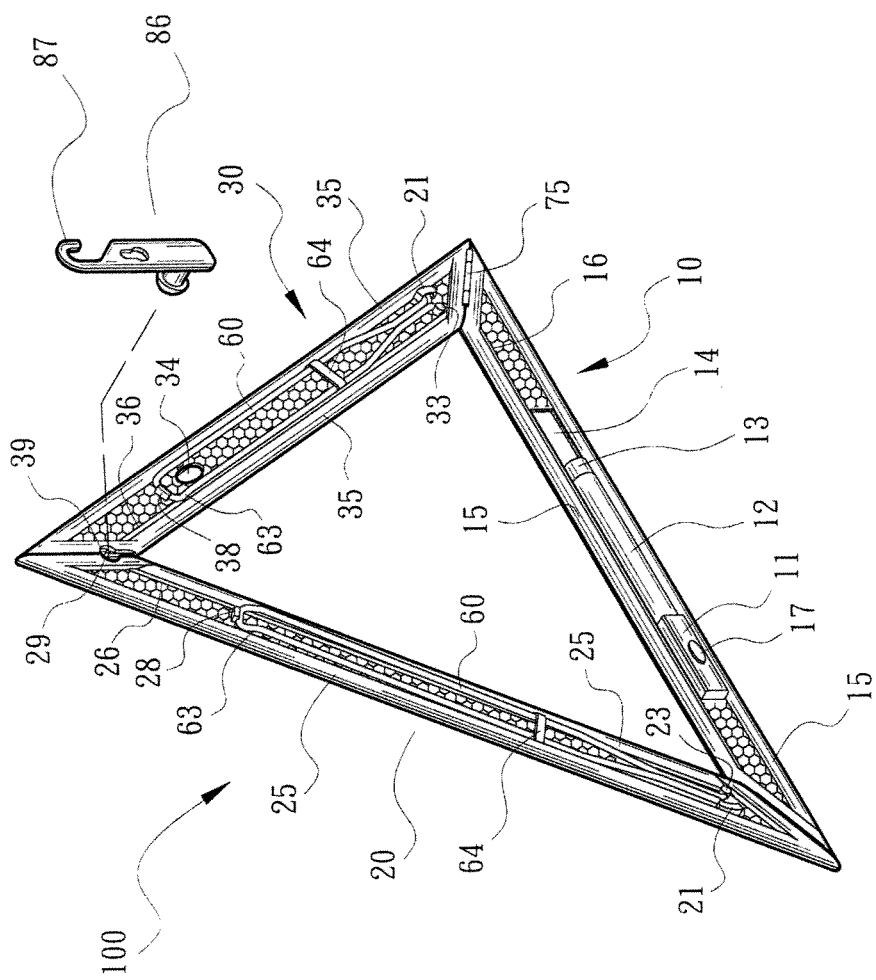
FIG. 1 is a perspective assembled view of the warning triangle of the present invention.
Figure 2:
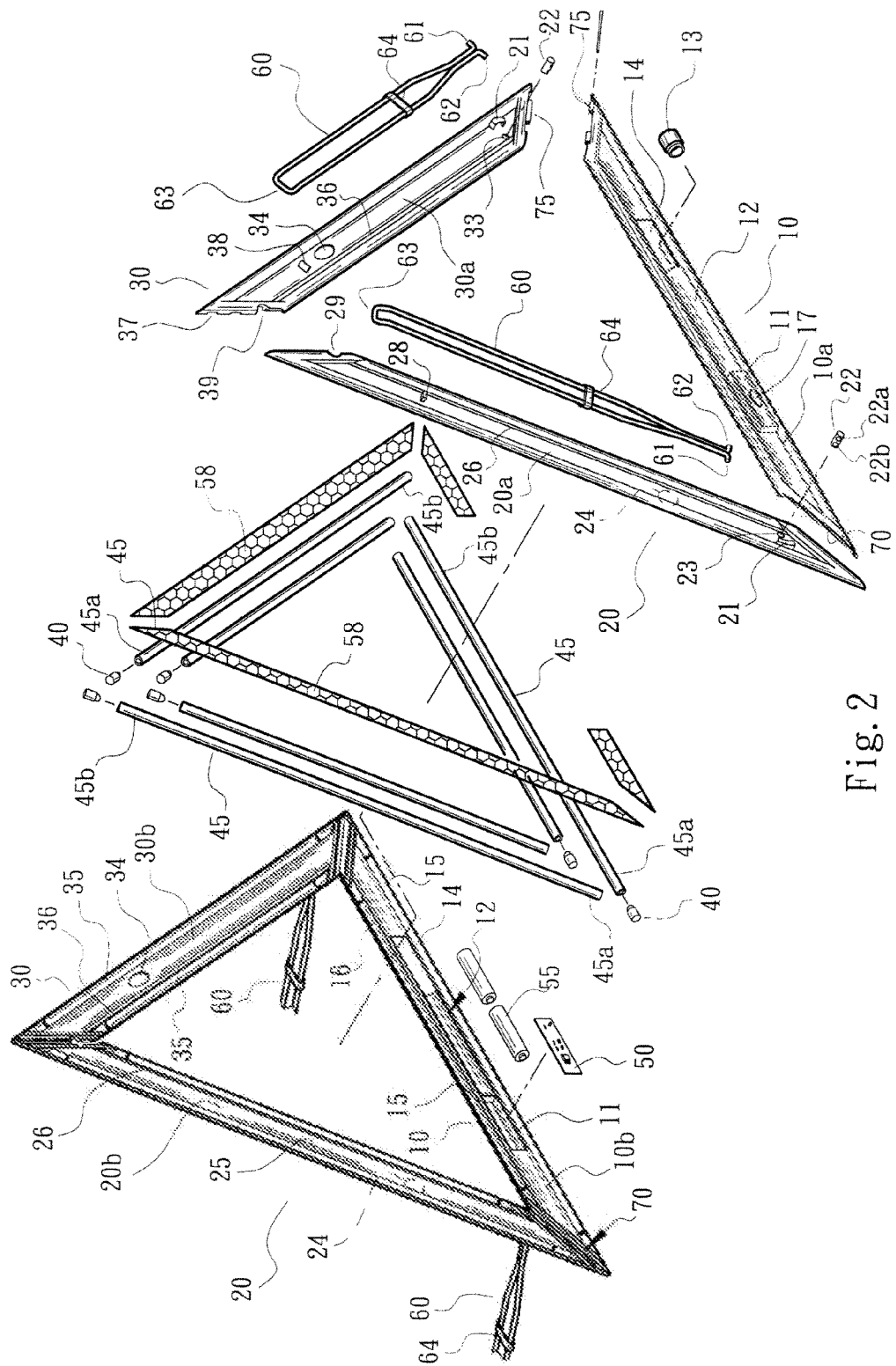
FIG. 2 is a perspective exploded view of the warning triangle of the present invention.
Figure 3:
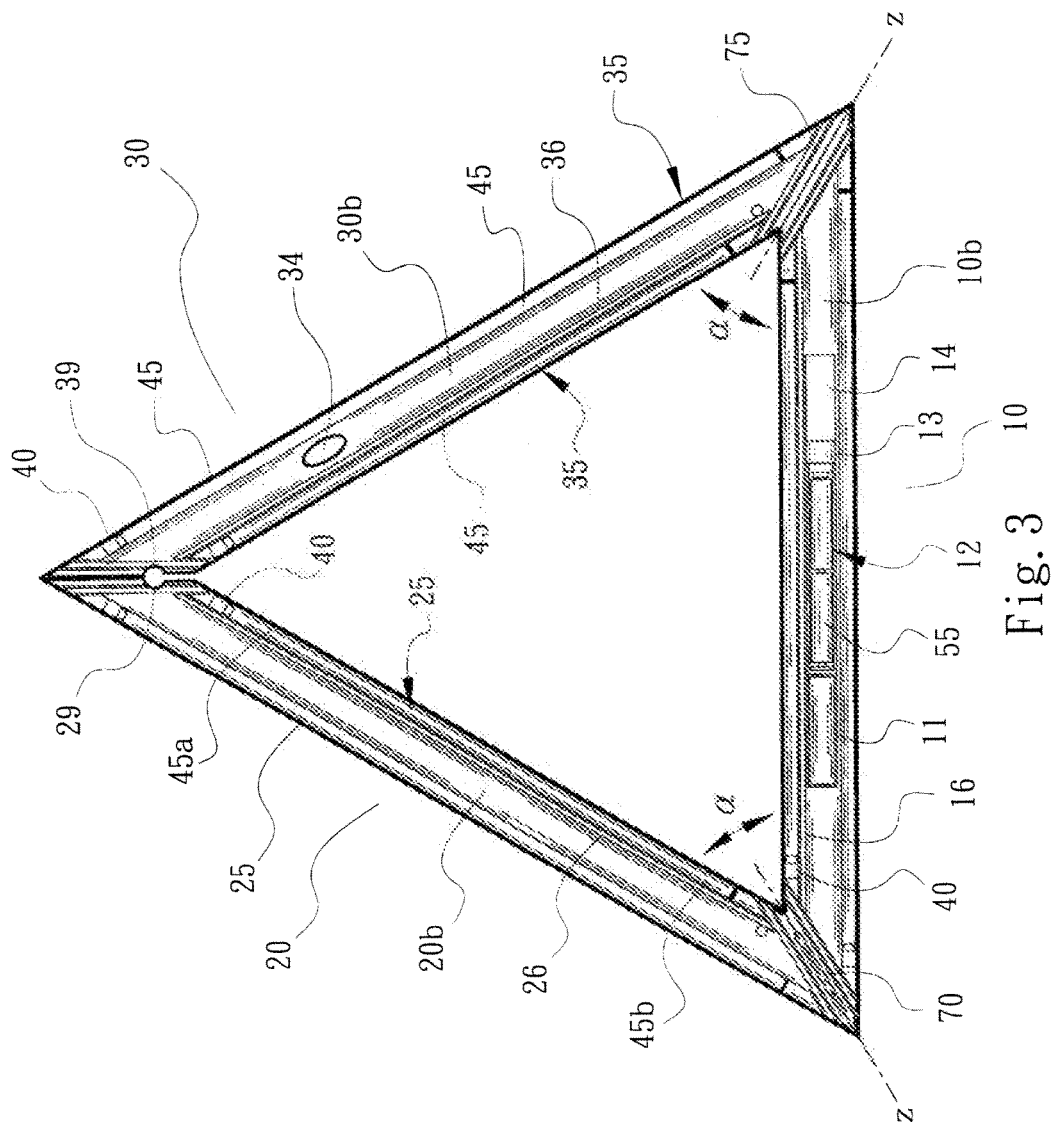
FIG. 3 is a plane view of the warning triangle of the present invention, showing the second faces of three board bodies of the warning triangle and the internal layouts thereof.

Please refer to FIGS. 1, 2 and 3. The warning triangle structure 100 of the present invention includes a first board body 10, a second board body 20 and a third board body 30. The first board body 10 is provided with a chamber 11 and a subsidiary chamber 12 for mounting therein a control circuit 50 (such as a circuit board) and power supply 55 (such as cells). One end of the subsidiary chamber 12 is an open end for installing/uninstalling the cells. A cap 13 is locked at the open end for blocking the same. Preferably, the first board body 10 is formed with a hollow operation space 14 in adjacency to the open end of the subsidiary chamber 12 for an operator to install/uninstall the cells.

In this embodiment, each board body 10, 20, 30 is provided with a cavity 15, 25, 35 lengthwise extending along the board body 10, 20, 30 for installing therein one or more light source 40 such as LED. To speak more specifically, the first board body 10 has a first face 10a and a second face 10b. The second board body 20 has a first face 20a and a second face 20b. The third board body 30 has a first face 30a and a second face 30b. After connected with each other, the first faces 10a, 20a, 30a and the second faces 10b, 20b, 30b together define the cavities 15, 25, 35. In practice, the first faces 10a, 20a, 30a and the second faces 10b, 20b, 30b of the board bodies 10, 20, 30 can be connected by means of high-frequency fusion. FIGS. 2 and 3 show that each board body 10, 20, 30 is formed with a channel 16, 26, 36 for wiring.

In a preferred embodiment as shown in FIGS. 2 and 3, at least one assembly of light source 40 (LED) and light guide strip 45 for guiding light is mounted in each cavity 15, 25, 35 of the board body 10, 20, 30. The light guide strip 45 serves to transmit the light emitted from the light source 40 from a proximal end to a distal end, whereby the board bodies 10, 20, 30 can reflect the light outward to achieve a warning effect in accordance with energy-saving requirement. As shown in the drawings, the light source 40 is disposed at one end of the cavity 15, 25, 35 and electrically connected to the control circuit 50 and the power supply 55. Accordingly, the light source 40 is powered by the power supply 55 to emit light. The light guide strips 45 lengthwise extend along the cavities 15, 25, 35 of the board bodies 10, 20, 30. Each light guide strip 45 has a first end 45a and a second end 45b. The light guide strip 45 serves to transmit the light (or flicker) generated by the light source 40 from the first end 45a to the second end 45b.

In a preferred embodiment, a reflection unit 58 is disposed between the first face 10a, 20a, 30a and the second face 10b, 20b, 30b of each board body 10, 20, 30 for reflecting the light transmitted from the light source 40 or the light guide strip 45 out of the board body 10, 20, 30. It should be noted that each board body 10, 20, 30 (surface) can be in the form of a reflection board. As shown in the drawings, the reflection unit 58 is disposed in the cavity 15, 25, 35 or between the light guide strips 45.

Please refer to FIGS. 2 and 3. A hinge 70 is mounted between the first board body 10 and the second board body 20. Also, a hinge 75 is mounted between the first board body 10 and the third board body 30. Accordingly, the second and third board bodies 20, 30 can be rotated relative to the first board body 10 between a collapsed state and an extended state. (This will be more specifically described hereinafter).

Please refer to FIGS. 4, 5 and 6. The second board body 20 is provided with a tenon section 27, while the third board body 30 is provided with a mortise section 37 corresponding to the tenon section 27. The tenon section 27 can be inserted into the mortise section 37 to connect the second board body 20 with the third board body 30 as shown in FIG. 1.

It is mentioned above that the second and third board bodies 20, 30 can be rotated to collapse the warning triangle 100. This is now described in detail with reference to FIGS. 2 and 3. The hinge 70 is mounted or directly formed between the second face 10b of the first board body 10 and the second face 20b of the second board body 20. Accordingly, the second board body 20 can be rotated about the hinge 70 to collapse onto the second face 10b of the first board body 10. The hinge 75 is mounted or directly formed between the first face 10a of the first board body 10 and the first face 30a of the third board body 30. Accordingly, the third board body 30 can be rotated about the hinge 75 to collapse onto the first face 10a of the first board body 10 as shown in FIGS. 7 and 8.

In a preferred embodiment, the hinge 70 is mounted or directly formed on the second face 10b of the first board body 10 and the second face 20b of the second board body 20 along an angle bisector z of the angle α contained between the first and second board bodies 10, 20 (as shown in FIG. 3). Also, the hinge 75 is mounted or directly formed on the first face 10a of the first board body 10 and the first face 30a of the third board body 30 along an angle bisector z of the angle α contained between the first and third board bodies 10, 30.

Figures 7, 8:
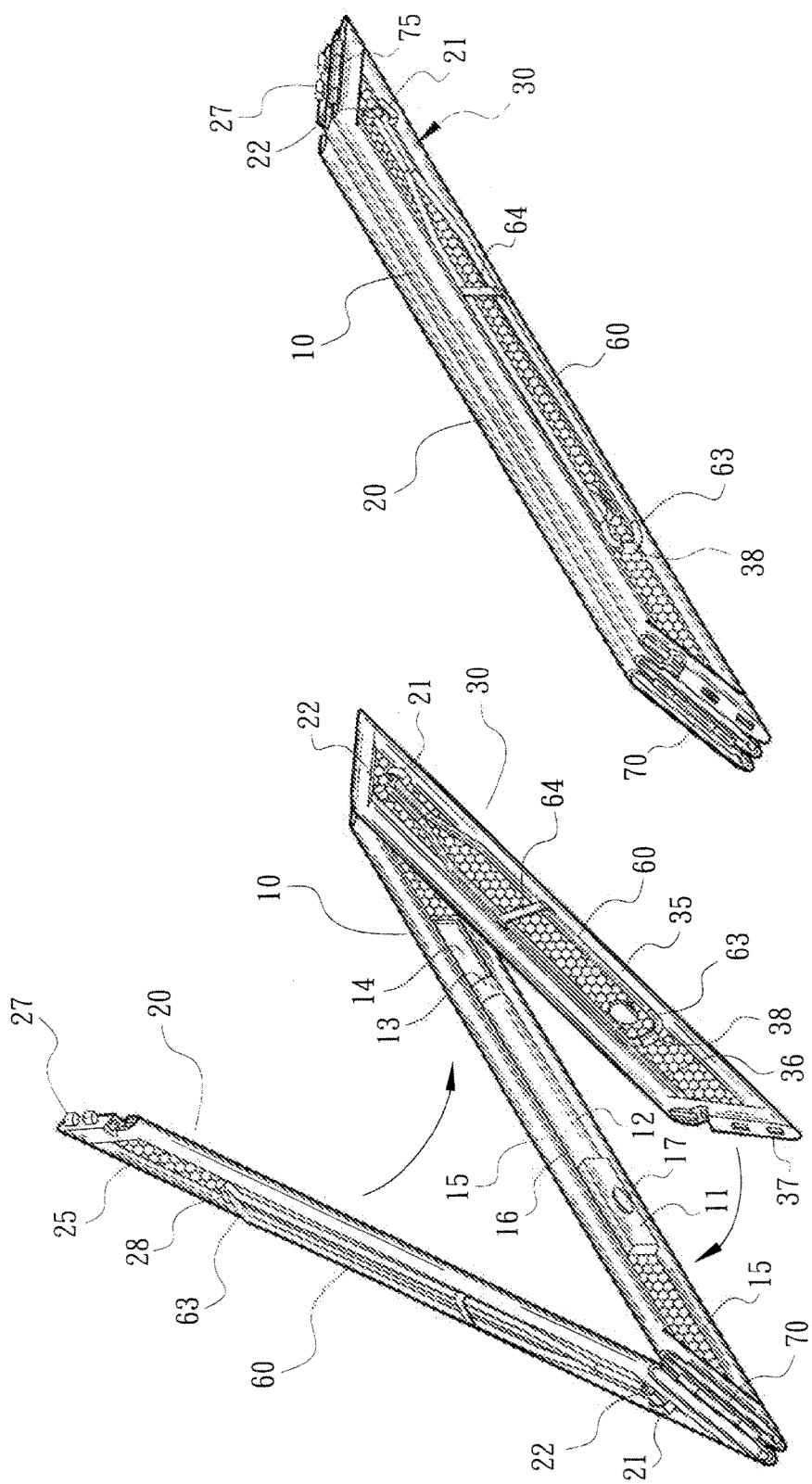
FIG. 7 is a perspective view showing that the warning triangle of the present invention is to be collapsed.
FIG. 8 is a perspective view according to FIG. 7, showing that the warning triangle of the present invention is collapsed.

FIG. 8 shows that the second and third board bodies 20, 30 are completely collapsed onto the second face 10b and first face 10a of the first board body 10. The conventional warning triangle cannot be fully collapsed and thus will occupy much room when stored. In contrast, the warning triangle 100 of the present invention can be completely collapsed to minimize the volume and the occupied room for easy storage.

Figure 2A:
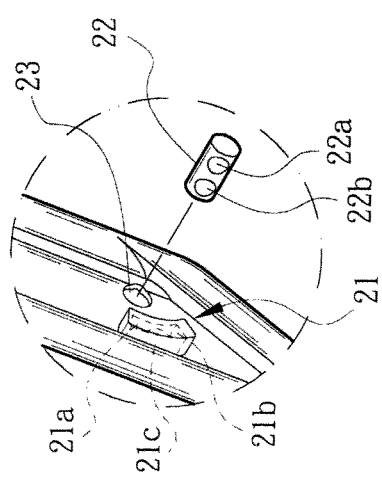
FIG. 2A is an enlarged view showing the structure of the socket seat and the pin member of the present invention.

Please refer to FIGS. 2 and 2A. Each of the second and third board bodies 20, 30 is provided with a socket seat 21 and a pin member 22 for pivotally connecting with a movable stand 60. To speak more specifically, the socket seats 21 and the pin members 22 are respectively disposed on the first faces 20a, 30a and the second faces 20b, 30b of the second and third board bodies 20, 30. As shown in the drawings, each socket seat 21 has two dents 21a, 21b and a ridge section 21c between the two dents 21a, 21b.

The pin members 22 perpendicularly protrude from the first faces 20a, 30a and second faces 20b, 30b of the second and third board bodies 20, 30. Each pin member 22 has a hole 22a, 22b. That is, the pin members 22 can be integrally formed on the first faces 20a, 30a and second faces 20b, 30b of the second and third board bodies 20, 30. In this embodiment, two ends of each pin member 22 are respectively formed with two holes 22a, 22b. The pin members 22 are passed through two holes 23, 33 respectively formed on the second and third board bodies 20, 30 and connected with the second and third board bodies 20, 30. The holes 22a, 22b are respectively positioned where the first faces 20a, 30a and second faces 20b, 30b of the second and third board bodies 20, 30 are positioned.

Please further refer to FIG. 2. Each stand 60 has two head ends 61, 62 and a tail end 63 corresponding to the socket seat 21 and the pin member 22. The head ends 61, 62 are respectively mounted in the dent 21a or 21b of the socket seat 21 and the holes 22a, 22b of the pin member 22, whereby the stand 60 can be freely moved or rotated. Accordingly, the stands 60 can be overlaid on the first faces 20a, 30a and second faces 20b, 30b of the second and third board bodies 20, 30. Alternatively, the stands 60 can be unstretched about the socket seats 21 and the pin members 22 to support the board bodies 10, 20, 30 for use of the warning triangle 100.

Please refer to FIGS. 2, 7 and 8. In a preferred embodiment, the first faces 20a, 30a and second faces 20b, 30b of the second and third board bodies 20, 30 are provided with retainer keys 28, 38. When the stands 60 are overlaid on the first faces 20a, 30a and second faces 20b, 30b of the second and third board bodies 20, 30, the tail ends 63 of the stands 60 are retained by the retainer keys 28, 38 unless a user applies a pulling force to the stands 60 to release the stands 60 from the retainer keys 28, 38.

Basically, the stand 60 can have the form of a board or a strip. In this embodiment, the stand 60 is a strip member with a rectangular configuration. Preferably, a fixing plate 64 is assembled with the stand 60 to help in keeping the shape of the stand 60. The stand 60 can be made of plastic, acrylic, metal or magnetic material. Preferably, the stand 60 is made of steel material with a rectangular shape. In this case, the stand 60 can have an elastic (tightening effect) and operation range. The elastic effect and operation range are such that the head ends 61, 62 of the stand 60 are normally pressed into the dent 21a or 21b of the socket seat 21 and the holes 22a, 22b of the pin member 22, allowing a user to move the head end 61 or rotate the head end 62.

In a modified embodiment, the tail end 63 of the stand 60 is provided with a magnet. In this case, the warning triangle 100 can attract the roof of a vehicle, whereby the drivers of other vehicles can see the broken vehicle from a remote place.

Please refer to FIGS. 8 and 9. When the first, second and third board bodies 10, 20, 30 are in the collapsed state, the head end 61 of the stand 60 is positioned in the dent 21a of the socket seat 21. After a user rotates and unstretches the second and third board bodies 20, 30 about the hinges 70, 75, the tenon section 27 is inserted into the mortise section 37 to connect the second and third board bodies 20, 30 with each other and form the warning triangle 100. Please refer to FIGS. 9 and 10, the user can then operate the head end 61 of the stand 60 to pass over the ridge section 21c of the socket seat and enter the dent 21b. In the meantime, the head end 62 is rotated within the hole 22a, 22b of the pin member 22. With the movement of the head end 61 from the dent 21a to the dent 21b, the stands 60 are gradually rotated away from the second and third board bodies 20, 30 from an overlaid state to a stretched state for supporting the warning triangle 100 as shown in FIG. 11.

Figure 11:
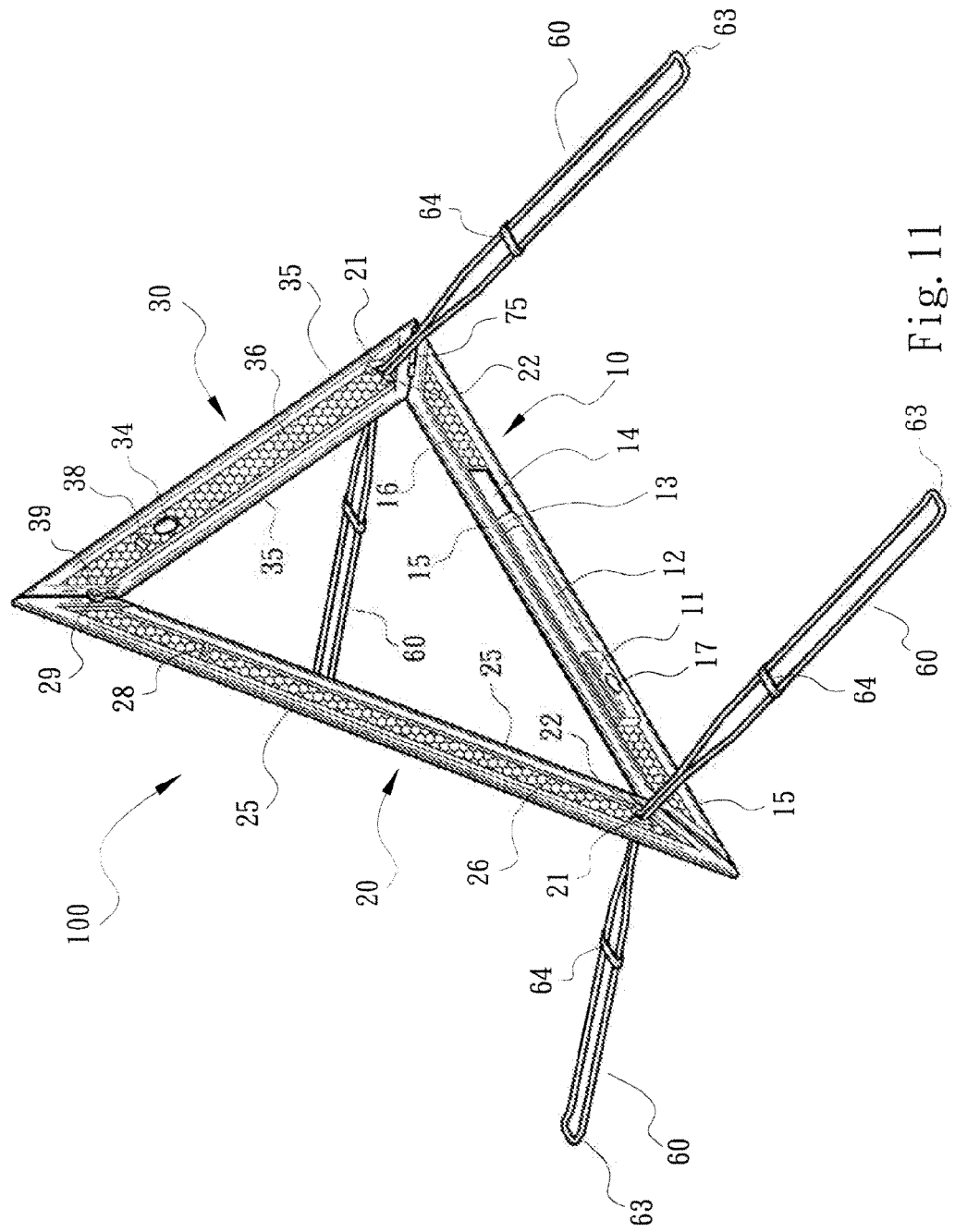
FIG. 11 is a perspective view showing that the warning triangle of the present invention is unstretched for use.

FIG. 11 shows that in the stretched state, the stands 60 provide four support points for the warning triangle 100. In other words, the four support points of the stands 60 give the warning triangle 100 a larger bottom area to enhance the stability of use of the warning triangle 100.

It should be noted when the user operates the head end 61 of the stand 60 to pass over the ridge section 21c and enter the dent 21a, the head end 62 is rotated within the hole 22a, 22b of the pin member 22. With the movement of the head end 61 from the dent 21b to the dent 21a, the stands 60 are gradually rotated from the stretched state to the overlaid state and overlaid on the second and third board bodies 20, 30. In the meantime, the user can operate and rotate the second board body 20 about the hinge 70 to collapse onto the second face 10b of the first board body 10. Also, the user can operate and rotate the third board body 30 about the hinge 75 to collapse onto the first face 10a of the first board body 10. Accordingly, the first, second and third board bodies 10, 20, 30 can be completely collapsed to minimize the volume of the warning triangle 100.

Figure 12:
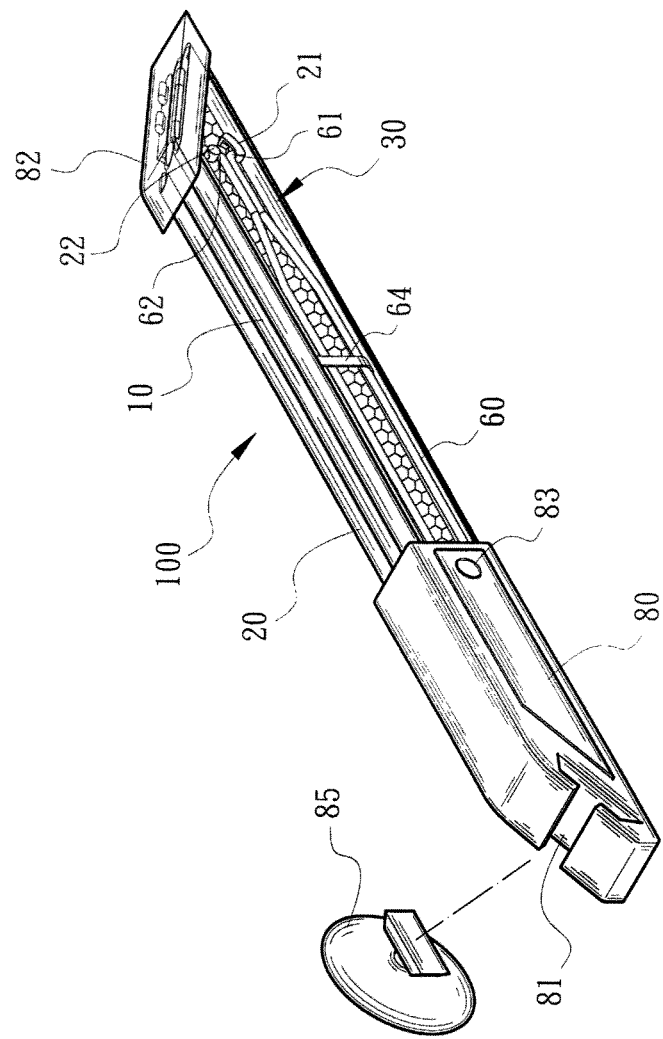
FIG. 12 is a perspective view showing that the warning triangle of the present invention is collapsed and enclosed in the protective jacket.
Figure 13:
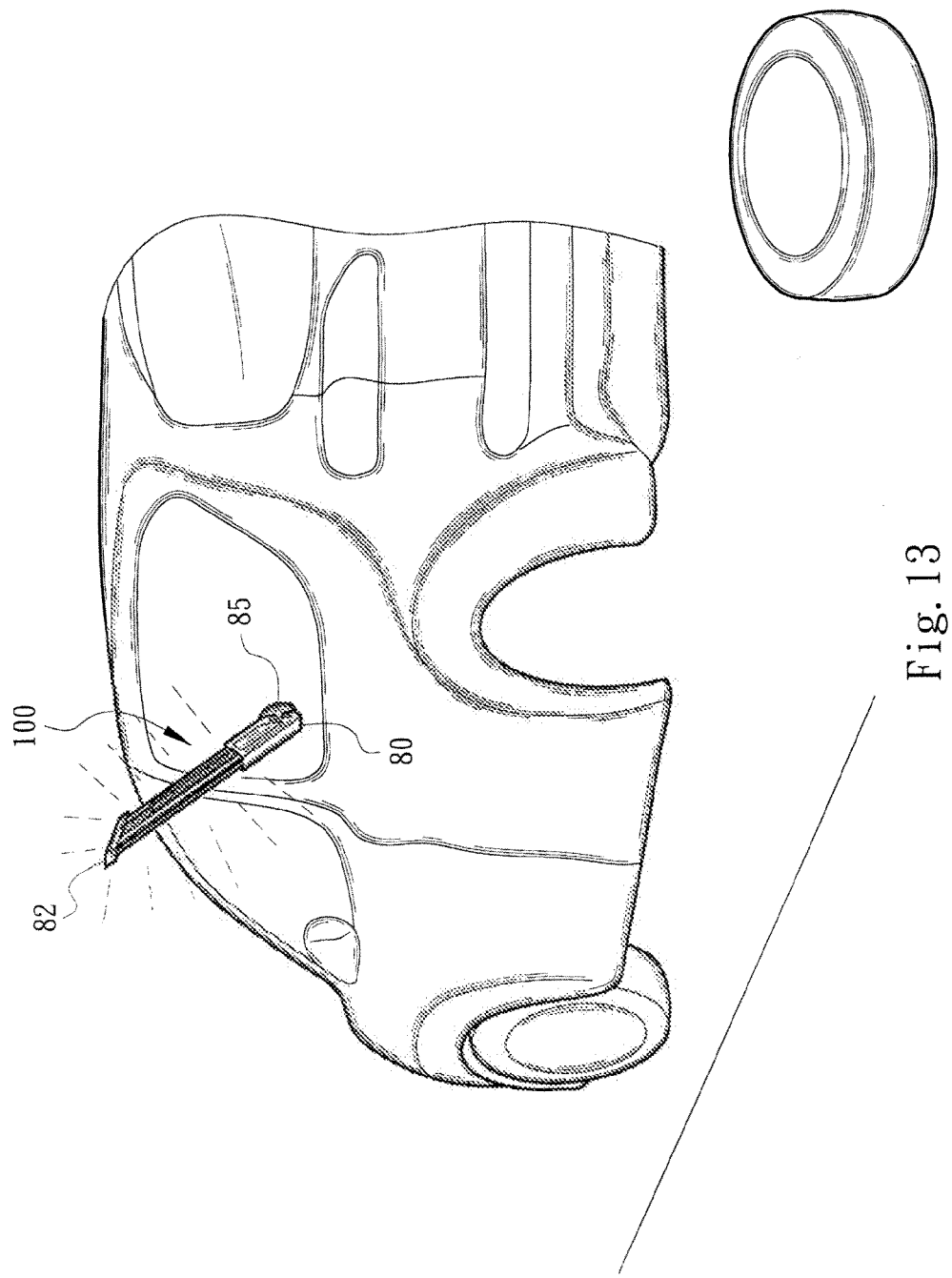
FIG. 13 is a perspective view showing that the warning triangle of the present invention is collapsed and affixed to a vehicle by means of a sucker.

Please refer to FIG. 12. In a preferred embodiment, in the collapsed state, at least a part (such as two ends or one end) of the first, second and third board bodies 10, 20, 30 is enclosed in a protective jacket 80 and protective cap 82. The protective jacket 80 and the protective cap 82 can be separated from each other or connected with each other as shown in the drawings. The protective jacket 80 is formed with a slot 81 for pivotally connecting with a fixing device (such as a magnet or a hanging hook) or a sucker 85. Accordingly, as necessary, a user can conveniently affix the warning triangle 100 to the surface of an article, (such as a window of a vehicle as shown in FIG. 13), especially to the surface of a vehicle parked on one side of a road at night, to achieve a warning effect for passing persons and vehicles so as to ensure safety.

Please refer to FIG. 2. A switch 17 is disposed on the chamber 11 of the first board body 10 and electrically connected with the control circuit 50 and the power supply 55. The second and third board bodies 20, 30 are formed with openings 24, 34 for access to the switch 17. When the first, second and third board bodies 10, 20, 30 are in the collapsed state, a user to press the switch 17 to turn on the light sources 40 for the light guide strips 45 to emit warning light as a traffic baton or a warning baton.

In a preferred embodiment, the protective jacket 80 is formed with an opening 83 for access to the switch 17. Alternatively, the protective jacket 80 is provided with a pushbutton (not shown) in contact with the switch 17. A use can press the pushbutton to operate the switch 17 to turn on the light source 40 for the light guide strip 45 to emit warning light as a traffic baton or a warning baton.

In a modified embodiment as shown in FIGS. 1 and 2, the second and third board bodies 20, 30 are respectively formed with notches 29, 39. When the second and third board bodies 20, 30 are assembled, the notches 29, 39 together form a hole for pivotally connecting with a sucker 85 or a connection member 86. The connection member 86 includes a hook section 87 in the form of a plate for hooking on rear side of goods. In this case, the warning triangle 100 can provide clear warning effect for the rearward vehicles and persons, especially when driving or after parking the vehicle at night. Conventionally, a red cloth strip is tied on rear side of goods for achieving warning effect. In comparison with the conventional measure, the warning triangle 100 of the present invention cooperates with the light sources 40, the light guide strips 45 and the reflection units 50 to provide clearer indication effect for the goods.

In conclusion, the warning triangle of the present invention has a simplified structure and is operable in accordance with the requirement of energy saving to overcome the shortcomings of complicated light-emitting structure and higher cost of the conventional device. Each board body 10, 20, 30 has an internal cavity 15, 25, 35 for receiving the light source 40, the light guide strip 45 and the reflection unit 58. The board bodies 10, 20, 30 can be extended or collapsed. Moreover, the second and third board bodies 20, 30 are provided with movable or rotatable stands 60 for supporting the warning triangle 100. In the collapsed state, the volume of the warning triangle 100 is minimized. In contrast, the conventional warning triangle cannot be completely collapsed so that the occupied room is larger. Furthermore, the warning triangle 100 of the present invention can be used in different forms in adaptation to different situations to enhance the warning effect and ensure safety.

The above embodiments are only used to illustrate the present invention, not intended to limit the scope thereof. Many modifications of the above embodiments can be made without departing from the spirit of the present invention.

What is claimed is:

1. A warning triangle structure comprising a first board body, a second board body and a third board body, which are assembled with each other, each of the board bodies having a first face and a second face, which define an internal cavity, at least one light source being disposed in the cavity, the first board body being provided with a chamber in which a control circuit is mounted for controlling the light source to emit light, the warning triangle further comprising a power supply connected to the light source and the control circuit for powering the light source and the control circuit;
    wherein a switch is disposed on the chamber of the first board body and electrically connected with the control circuit, the third board body being formed with an opening corresponding to the switch for access to the switch.

2. The warning triangle structure as claimed in claim 1, wherein the first board body has a subsidiary chamber for mounting therein the power supply.

3. The warning triangle structure as claimed in claim 1, wherein the light source and a light guide strip for guiding light are mounted in the cavity.

4. The warning triangle structure as claimed in claim 1, wherein a reflection unit is disposed between the first and second faces of each board body.

5. The warning triangle structure as claimed in claim 1, wherein a first hinge is mounted between the first board body and the second board body and a second hinge is mounted between the first board body and the third board body, whereby the second and third board bodies can be rotated about the hinges relative to the first board body between a collapsed state and an extended state, the first hinge being positioned along an angle bisector of an angle contained between the first and second board bodies, the second hinge being positioned along an angle bisector of an angle contained between the first and third board bodies.

6. The warning triangle structure as claimed in claim 1, wherein the second and third board bodies are provided with pivot structure for pivotally connecting the second and third board bodies.

7. The warning triangle structure as claimed in claim 1, wherein the second and third board bodies are pivotally connected with at least one stand, which is freely movable.

8. The warning triangle structure as claimed in claim 7, wherein the second and third board bodies are provided with socket seats and pin members, each stand having two head ends corresponding to the socket seats and the pin members, the head ends of the stands being mounted in the socket seats and the pin members, each socket seat having a first dent and a second dent and a ridge section formed between the first and second dents, each pin member having at least one hole, the stand having two head ends and a tail end corresponding to the socket seats and the pin members, the head ends of the stands being respectively mounted in the first and second dents of the socket seats and the holes of the pin members, whereby the stands are freely movable.

9. The warning triangle structure as claimed in claim 7, wherein the first and second faces of the second and third board bodies are provided with retainer keys for retaining the stands.

10. The warning triangle structure as claimed in claim 7, wherein the stand has the form of a strip with a rectangular configuration and a fixing plate is assembled with the stand.

11. The warning triangle structure as claimed in claim 5, wherein at least a part of the first, second and third board bodies is enclosed in a protective jacket and a protective cap.

12. The warning triangle structure as claimed in claim 7, wherein the first and second faces of the first board body are provided with at least one stand, which is freely movable.

13. A warning triangle structure comprising a first board body, a second board body and a third board body, which are assembled with each other, each of the board bodies having a first face and a second face, a first hinge being mounted between the first board body and the second board body and a second hinge being mounted between the first board body and the third board body, whereby the second and third board bodies can be rotated about the hinges relative to the first board body between a collapsed state and an extended state, the first hinge being positioned along an angle bisector of an angle contained between the first and second board bodies, the second hinge being positioned along an angle bisector of an angle contained between the first and third board bodies;
    wherein the second and third board bodies are pivotally connected with at least one stand, which is freely movable; and the second and third board bodies are provided with socket seats and pin members, each stand having two head ends corresponding to the socket seats and the pin members, the head ends of the stands being mounted in the socket seats and the pin members, each socket seat having a first dent and a second dent and a ridge section formed between the first and second dents, each pin member having at least one hole, the stand having two head ends and a tail end corresponding to the socket seats and the pin members, the head ends of the stands being respectively mounted in the first and second dents of the socket seats and the holes of the pin members, whereby the stands are freely movable.

14. The warning triangle structure as claimed in claim 13, wherein the first and second faces of each board body define an internal cavity, at least one light source being disposed in the cavity, the first board body being provided with a chamber in which a control circuit is mounted for controlling the light source to emit light, the warning triangle further comprising a power supply connected to the light source and the control circuit for powering the light source and the control circuit.

15. The warning triangle structure as claimed in claim 13, wherein the first board body has a subsidiary chamber for mounting therein the power supply.

16. The warning triangle structure as claimed in claim 14, wherein the light source and a light guide strip for guiding light are mounted in the cavity.

17. The warning triangle structure as claimed in claim 13, wherein a reflection unit is disposed between the first and second faces of each board body.

18. The warning triangle structure as claimed in claim 13, wherein the second and third board bodies are provided with a pivot structure for pivotally connecting the second and third board bodies.

19. The warning triangle structure as claimed in claim 13, wherein the first and second faces of the second and third board bodies are provided with retainer keys for retaining the stands.

20. The warning triangle structure as claimed in claim 13, wherein the stand has the form of a strip with a rectangular configuration and a fixing plate is assembled with the stand.

21. The warning triangle structure as claimed in claim 13, wherein at least a part of the first, second and third board bodies is enclosed in a protective jacket and a protective cap.

22. The warning triangle structure as claimed in claim 14, wherein a switch is disposed on the chamber of the first board body and electrically connected with the control circuit, the third board body being formed with an opening corresponding to the switch for access to the switch.

23. The warning triangle structure as claimed in claim 13, wherein the first and second faces of the first board body are provided with at least one stand, which is freely movable.

24. A warning triangle structure comprising a first board body, a second board body and a third board body, which are assembled with each other, each of the board bodies having a first face and a second face, one of the first, second and third board bodies being pivotally connected with at least one stand, which is freely movable;

wherein a first hinge being mounted between the first board body and the second board body and a second hinge being mounted between the first board body and the third board body, whereby the second and third board bodies can be rotated about the hinges relative to the first board body between a collapsed state and an extended state, the first hinge being positioned along an angle bisector of an angle contained between the first and second board bodies, the second hinge being positioned along an angle bisector of an angle contained between the first and third board bodies.

25. The warning triangle structure as claimed in claim 24, wherein the first and second faces of each board body define an internal cavity, at least one light source being disposed in the cavity, the first board body being provided with a chamber in which a control circuit is mounted for controlling the light source to emit light, the warning triangle further comprising a power supply connected to the light source and the control circuit for powering the light source and the control circuit.

26. The warning triangle structure as claimed in claim 25, wherein the first board body has a subsidiary chamber for mounting therein the power supply.

27. The warning triangle structure as claimed in claim 25, wherein the light source and a light guide strip for guiding light are mounted in the cavity.

28. The warning triangle structure as claimed in claim 24, wherein a reflection unit is disposed between the first and second faces of each board body.

29. The warning triangle structure as claimed in claim 24, wherein the second and third board bodies are provided with a pivot structure for pivotally connecting the second and third board bodies.

30. The warning triangle structure as claimed in claim 24, wherein the second and third board bodies are provided with socket seats and pin members, each stand having two head ends corresponding to the socket seats and the pin members, the head ends of the stands being mounted in the socket seats and the pin members, each socket seat having a first dent and a second dent and a ridge section formed between the first and second dents, each pin member having at least one hole, the stand having two head ends and a tail end corresponding to the socket seats and the pin members, the head ends of the stands being respectively mounted in the first and second dents of the socket seats and the holes of the pin members, whereby the stands are freely movable.

31. The warning triangle structure as claimed in claim 24, wherein the first board body is provided with socket seats and pin members, each stand having two head ends corresponding to the socket seats and the pin members, the head ends of the stands being mounted in the socket seats and the pin members, each socket seat having a first dent and a second dent and a ridge section formed between the first and second dents, each pin member having at least one hole, the stand having two head ends and a tail end corresponding to the socket seats and the pin members, the head ends of the stands being respectively mounted in the first and second dents of the socket seats and the holes of the pin members, whereby the stands are freely movable.

32. The warning triangle structure as claimed in claim 24, wherein the first and second faces of the second and third board bodies are provided with retainer keys for retaining the stands.

33. The warning triangle structure as claimed in claim 24, wherein the first and second faces of the first board body are provided with retainer keys for retaining the stands.

34. The warning triangle structure as claimed in claim 24, wherein the stand has the form of a strip with a rectangular configuration and a fixing plate is assembled with the stand.

35. The warning triangle structure as claimed in claim 24, wherein at least a part of the first, second and third board bodies is enclosed in a protective jacket and a protective cap.

36. The warning triangle structure as claimed in claim 25, wherein a switch is disposed on the chamber of the first board body and electrically connected with the control circuit, the third board body being formed with an opening corresponding to the switch for access to the switch.

\* \* \* \* \*